United States Patent Office 3,341,521
Patented Sept. 12, 1967

3,341,521
ADAMANTYL SUBSTITUTED AZEPIN-ONE SEDATIVE COMPOUNDS
Jack Bernstein, New Brunswick, N.J., assignor, by mesne assignments, to E. R. Squibb & Sons, Inc., New York, N.Y., a corporation of Delaware
No Drawing. Filed June 24, 1965, Ser. No. 466,809
12 Claims. (Cl. 260—239.3)

This invention relates to new chemical compounds, more particularly to new compounds having the formula (I)

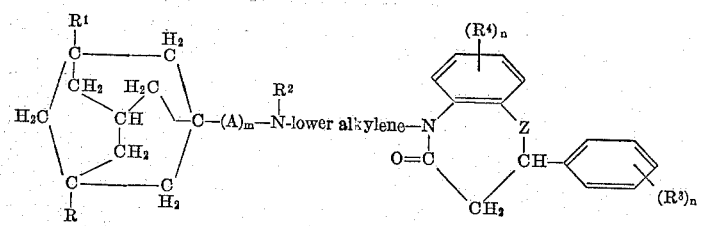

and to acid addition salts thereof.

The symbols in Formula I have the following meanings: R and $R^1$ each represents hydrogen, halo, lower alkyl and lower alkoxy; $R^2$ represents hydrogen and lower alkyl; $R^3$ and $R^4$ each represents hydrogen, lower alkyl, lower alkoxy, nitro, amino, halo and halo-lower alkyl; Z represents oxa (—O—), thia (—S—), sulfinyl $(-\overset{O}{\underset{\|}{S}}-)$ sulfonyl (—SO$_2$—), and lower alkanoylamino $\left(\begin{array}{c} \text{lower alkanoyl} \\ | \\ -\text{N}- \end{array}\right)$ A represents lower alkylene, $m$ represents 0 or 1 and $n$ represents an integer from 1 to 3.

The lower alkyl groups represented by the various symbols include straight and branched chain saturated aliphatic groups such as methyl, ethyl, propyl, isopropyl, butyl, isobutyl, t-butyl, amyl, isoamyl, hexyl and the like. Methyl and ethyl are preferred. The lower alkylene groups are divalent radicals of the same type. The lower alkoxy groups contain alkyl groups of the same character attached to the oxygen.

Each of the four halogens is contemplated by the terms "halo" and "halo-lower alkyl", but in the case of the halogens themselves chlorine and bromine are preferred while trifluoromethyl is the preferred halo-alkyl group.

The adamantyl groups include unsubstituted adamantyl and simply substituted adamantyl, e.g., 3-R, 5-$R^1$-adamantyl, wherein R and $R^1$ each represents hydrogen, halogen, lower alkyl and lower alkoxy as indicated above.

The preferred members of the class defined by Formula I are those wherein R, $R^1$, $R^2$, $R^3$ and $R^4$ are all hydrogen, $m$ is 0, the lower alkylene group has two to three carbon atoms and Z is sulfur.

The new compounds of this invention can be prepared by condensing a compound of the formula (II)

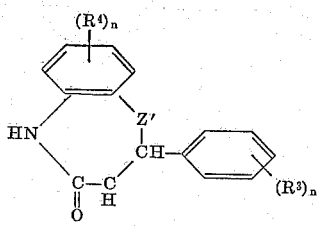

wherein $R^3$, $R^4$ and $n$ have the same meaning as in Formula I and Z' represents sulfur (—S—), oxygen (—O—), or $\overset{H}{\underset{}{-N}}$-lower alkanoyl with a compound of the formula (III)

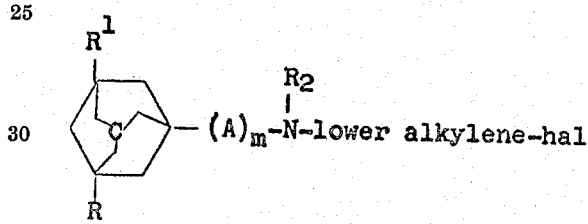

wherein R, $R^1$, $R^2$, A and $m$ have the same meaning as in Formula I and hal represents a halogen, preferably bromine or chlorine. This reaction is preferably conducted by heating the reactants in the presence of a basic condensing agent, e.g., an alkali metal, an alkali metal hydroxide such as sodium or potassium hydroxide. An inert organic solvent such as toluene may be used.

Those compounds wherein Z is sulfinyl or sulfonyl are produced by oxidation of a compound of Formula I wherein Z is sulfur, with an oxidizing agent such as hydrogen peroxide or potassium permanganate, or a peracid such as peracetic acid.

The starting materials of Formula II wherein Z' is sulfur are produced by reacting an appropriately substituted 2-aminobenzenethiol with an appropriately substituted cinnamic acid in refluxing toluene or dimethylformamide or by a simple heating together of the two reactants. The starting 2-aminobenzenethiols can readily be prepared by reducing, e.g., catalytically with hydrogen in the presence of platinum, 2-nitrothiophenol.

The starting materials of Formula II, where Z' is oxygen can be prepared by condensing an appropriately substituted benzaldehyde with an appropriately substituted 2'-hydroxyacetophenone, ring closing with pyrophosphoric acid to the appropriately substituted 2,3-dihydro-1,4-benzopyrone and treatment with sodium azide to give the desired 2,3-dihydro-1,5 benzoxapin-4-one.

The starting materials of Formula II, wherein Z' is $\overset{H}{\underset{}{-N}}$-lower alkanoyl are prepared by condensing an appropriately substituted o-phenylenediamine with an appropriately substituted ethyl-benzolyacetate, reducing the dihydro-4-phenylbenzodiazepin-2-one thus obtained to the tetrahydro-4-phenyl-benzodiazepin-2-one and acylating with a lower alkanoyl halide or a lower alkanoic acid anhydride.

The starting materials of Formula III may be prepared by the alkylation, with ethylene oxide or a halogenated alkanol, of an amine of the type Ad—(A)$_m$—NHR$_2$ where Ad represents an adamantyl residue, and A, m and R$_2$ have the same meaning as in Formula I. The aminoalkanol thus formed is then converted to the corresponding aminoalky halide by treatment with thionyl chloride, phosphorous trichloride or hydrogen bromide. Alternatively the amine of the type Ad—(A)$_m$—NHR$_2$ may be alkylated with a dihalide of the type hal-alkylene-hal' to yield the aminoalkyl halide.

The starting amines of the type of Ad—(A)$_m$—NHR$_2$ are prepared by the reduction of the corresponding amide with lithium aluminum hydride or by the reaction of an N-alkyl-acylamide with a halogenated adamantane, followed by hydrolysis to the N-alkyl-adamantanamine.

Suitable starting materials which may be utilized in preparing compounds of this invention include: 2-nitrobenzenethiol; halo-2-nitrobenzenethiols, such as 4-chloro-2-nitrobenzenethiol, 4-bromo-2-nitrobenzenethiol, 5-chloro-2-nitrobenzenethiol and 4,6-dichloro-2-nitrobenzenethiol; trifluoromethyl-2-nitrobenzenethiols, such as 4-trifluoromethyl-2-nitrobenzenethiol and 5-trifluoromethyl-2-nitrobenzenethiol; (lower alkyl)-2-nitrobenzenethiols, such as 5-methyl-2-nitrobenzenethiol, 4-ethyl-2-nitrobenzenethiol, 4,6-dimethyl-2-nitrobenzenethiol, and 3,4,5-trimethyl-2-nitrobenzenethiol; (lower alkoxy)-2-nitrobenzenethiols, such as 4-methoxy-2-nitrobenzenethiol, 5-ethoxy-2-nitrobenzenethiol, 4,6-diethoxy-2-nitrobenzenethiol and 3,4,5-trimethoxy-2-nitrobenzenethiol; 3'-chloro-2'-hydroxyacetophenone, 4'-bromo-2'-hydroxyacetophenone and 5'-fluoro-2'-hydroxyacetophenone; lower alkyl-2'-hydroxyacetophenones such as 3'-methyl-2'-hydroxyacetophenone and 4'-methyl-2'-hydroxyacetophenone; alkoxy-2'-hydroxyacetophenones such as 3'-methoxy-2'-hydroxyacetophenone, 5'-methoxy-2'-hydroxyacetophenone and 4'-ethoxy-2'-hydroxyacetophenone; nitro-2'-hydroxyacetophenones such as 3'-nitro-2'-hydroxyacetophenone, 4'-nitro-2'-hydroxyacetophenone and 5'-nitro-2'-hydroxyacetophenone as well as 4'-methoxy-5'-bromo-2'-hydroxyacetophenone and 4'-methyl-5'-bromo-2'-hydroxyacetophenone.

The bases of Formula I form acid addition salts by reaction with the common inorganic and organic acids. Such inorganic salts as the hydrohalides, e.g., hydrobromide, hydrochloride, hydroiodide, sulfates, nitrates, phosphates, borates, etc., and organic salts as acetate, oxalate, tartrate, malate, citrate, succinate, benzoate, ascorbate, salicylate, theophyllinate, camphorsulfonate, alkanesulfonate, e.g., methanesulfonate, arylsulfonate, e.g., benzenesulfonate, toluenesulfonate and the like are also within the scope of the invention. It is frequently convenient to effect the purification of the product by forming the acid salt. The base may be obtained therefrom by neutralization with an alkali hydroxide such as sodium hydroxide.

The new compounds of this invention have activity upon the central nervous system and are especially active as anti-depressants being useful in the alleviation of depressed states. They may be administered orally or parenterally in the form of tablets, capsules, elixirs, injectables or the like by incorporating the appropriate dosage of the base of Formula I or a physiologically acceptable acid addition salt thereof, e.g., about 25 to 500 mg., preferably about 50 to 250 mg., in a conventional vehicle according to accepted pharmaceutical practice.

The following examples are illustrative of the invention. All temperatures are on the centigrade scale.

EXAMPLE 1

*Preparation of 2,3-dihydro-5-[2-(N-methyl-1-adamantylamino)ethyl]-2-phenyl-1,5-benzothiazepin-4-one hydrochloride*

(A) PREPARATION OF 2-(N-METHYL-1-ADAMANTYLAMINO)ETHANOL

A 140 ml. stainless steel bomb is charged with 16.5 grams of N-methyl-1-adamantanamine, 5.0 grams of ethylene oxide and 50 ml. of aqueous tetrahydrofuran and heated at 70° for twelve hours. The solvent is removed by distillation and the residue fractionally distilled to yield the desired 2-(N-methyl-1-adamantylamino)ethanol.

(B) PREPARATION OF N-(2-BROMOETHYL)-N-METHYL-1-ADAMANTANAMINE HYDROBROMIDE

A solution of 20.9 grams of 2-(N-methyl-1-adamantylamino)ethanol in 100 ml. of chloroform is cooled to 0° and a solution of 30 grams of thionyl bromide in 150 ml. of chloroform added dropwise with vigorous stirring, while the temperature is maintained at 0–5°. The reaction mixture is then allowed to warm to room temperature, diluted with anhydrous ether and filtered to recover the N-(2-bromoethyl)-N-methyl - 1 - adamantanamine, hydrobromide. This is recrystallized from a mixture of ethanol and ether.

(C) PREPARATION OF 2,3-DIHYDRO-5-[2-(N-METHYL-1-ADAMANTYLAMINO)-ETHYL] - 2 - PHENYL-1,5-BENZOTHIAZEPIN-4-ONE HYDROCHLORIDE

To a stirred suspension of 7.8 grams of sodamide in 500 ml. of anhydrous toluene is added 50.8 grams of 2,3-dihydro-2-phenyl-1,5-benzothiazepin-4-one in 500 ml. of anhydrous toluene. The resulting mixture is stirred at room temperature for thirty minutes and the solution treated with a solution of 54 grams of N-(2-bromoethyl)-N-methyl-1-adamantanamine in 200 ml. of toluene [obtained by dissolving 72 grams of N-(2-bromoethyl)-N-methyl-1-adamantanamine hydrobromide in water and extracting the aqueous solution, after the addition of potassium carbonate, with toluene and drying the extract over anhydrous sodium sulfate]. The reaction mixture is stirred for twenty-four hours and is then treated with 100 ml. of water and the organic phase separated. The aqueous layer is discarded and the organic phase is added to a cold solution of 13 grams of hydrochloric acid in 200 ml. of water. The aqueous phase is then treated with a solution of ten grams of sodium hydroxide in 50 ml. of water. The liberated base is extracted with ether and the ether extracts dried with magnesium sulfate and treated with decolorizing carbon. Concentration of the ether gives the crude base.

The base is dissolved in 200 ml. of anhydrous ether and treated with an equivalent amount of hydrogen chloride dissolved in ether. The precipitated hydrochloride is filtered and washed with anyhydrous ether. The 2,3-dihydro-5-[2-(N - methyl - 1 - adamantylamino) - ethyl] - 2 - phenyl-1,5-benzothiazepin-4-one hydrochloride may be recrystallized from methanol-ether mixture.

EXAMPLE 2

*Preparation of 5-acetyl-1-[2-(N-methyl-1-adamantylamino)ethyl]-1,3,4,5-tetrahydro-4-phenyl - 2H - 1,5 - benzodiazepin-2-one hydrochloride*

(A) PREPARATION OF 1,3-DIHYDRO-4-PHENYL-2H-1,5-BENZODIAZEPIN-2-ONE

To a boiling solution of 7.2 grams of o-phenylenediamine in 50 ml. of xylene there is added dropwise, over the course of 30 minutes, a solution of 12.8 grams of ethylbenzoylacetate in 50 ml. of xylene. The reaction mixture is refluxed for an additional 30 minutes during which time about 30 ml. of distillate is collected. Upon cooling the reaction mixture, a crystalline solid is obtained. It is filtered and recrystallized from dioxane to give the desired 1,3-dihydro-4-phenyl-2H-1,5-benzodiazepin-2-one, melting at 204–206°.

(B) PREPARATION OF 1,3,4,5-TETRAHYDRO-4-PHENYL-2H-1,5-BENZODIAZEPIN-2-ONE

A suspension of 30 grams of 1,3-dihydro-4-phenyl-2H-1,5-benzodiazepin-2-one in 250 ml. of glacial acetic acid is treated with 3 grams of 5% palladium on carbon and shaken in a Parr hydrogenator at 50 p.s.i. (initial pressure) of hydrogen until the theoretical quantity of hydrogen is consumed. The catalyst is then filtered, and the acetic acid solution concentrated under reduced pressure. The residue is diluted with water and the precipitated solid is filtered. It is crystallized from ethyl acetate and the 1,3,4,5-tetrahydro-4-phenyl-2H-1,5-benzodiazepin-2-one thus obtained melts at 163–165°.

(C) PREPARATION OF 5-ACETYL-1,3,4,5-TETRAHYDRO-4-PHENYL-2H-1,5-BENZODIAZEPIN-2-ONE

A mixture of 18.5 grams of 1,3,4,5-tetrahydro-4-phenyl-2H-1,5-benzodiazepin-2-one and 40 ml. of acetic anhydride is boiled for 5 minutes and then poured into 400 ml. of water. The mixture is allowed to remain at room temperature for twelve hours with occasional stirring. The precipitated solid is filtered, washed thoroughly with water and crystallized from acetonitrile. The 5-acetyl-1,3,4,5-tetrahydro-4-phenyl-2H-1,5-benzodiazepin-2-one thus obtained melts at 200–202°.

(D) PREPARATION OF 5-ACETYL - 1 - [2-(N-METHYL-1-ADAMANTYLAMINO)ETHYL] - 1,3,4,5-TETRAHYDRO-4-PHENYL-2H-1,5-BENZODIAZEPIN-2-ONE HYDROCHLORIDE

A suspension of 9.8 grams of 5-acetyl-1,3,4,5-tetrahydro-4-phenyl-2H-1,5-benzodiazepin-2-one in 100 ml. of toluene is added to a stirred suspension of 1.4 grams of sodamide in 100 ml. of toluene. The reaction mixture is stirred for 30 minutes at 50° and then cooled to room temperature. To this solution there is added dropwise with vigorous stirring a solution of 13.5 grams of N-(2-bromoethyl)-N-methyl-1-adamantylamine in toluene. The mixture is stirred at room temperature for an additional hour and is then refluxed for four hours. The reaction mixture is then treated with 100 ml. of water and the organic phase separated. The aqueous layer is discarded and the organic phase is added to a cold solution of 13 grams of hydrochloric acid in 200 ml. of water. The addition of 10 grams of water liberates the base which is extracted with ether. The combined ether extracts are dried over anhydrous magnesium sulfate and treated with decolorizing carbon. The solution is filtered and the ether removed by distillation under reduced pressure to yield the base. The base is dissolved in 200 ml. of anhydrous ether and treated with an equivalent amount of hydrogen chloride dissolved in ether. The precipitated hydrochloride is filtered and washed with anhydrous ether. The 5-acetyl-1-[2 - (N - methyl - 1 - adamantylamino)ethyl] - 1,3,4,5-tetrahydro - 4 - phenyl - 2H - 1,5 - benzodiazepin - 2 - one hydrochloride is recrystallized from an ethanol-ether mixture.

EXAMPLE 3

Preparation of 2,3-dihydro-5-[2-(N-methyl-1-adamentylamine)ethyl] - 2 -phenyl - 1,5 - benzothiazepin - 4 - one 1-oxide hydrochloride A solution of 13.4 grams of 2,3-dihydro-5-[2-(N-methyl - 1 - adamantylamino)ethyl] -2 - phenyl - 1,5-benzothiazepin-4-one in 50 ml. of acetic acid is treated with 3.5 grams of a 30% hydrogen peroxide solution. The reaction mixture is allowed to remain at room temperature for 24 hours and is then diluted with 400 ml. of water. The mixture is made alkaline with potassium carbonate and is extracted with chloroform. The chloroform extract is washed with water, dried over anhydrous magnesium sulfate and concentrated under reduced pressure to yield 2,3 - dihydro - 5 - [2 - (N - methyl - 1 - adamanthylamino)ethyl] - 2 - phenyl - 1,5 - benzothiazepin-4-one 1-oxide. A solution of this base is then treated with an ethereal solution of hydrogen chloride to yield the hydrochloric acid salt.

EXAMPLE 4

Preparation of 2,3 - dihydro - 5 - [2 - (N - methyl - 1 - adamantylamino)ethyl] - 2 - phenyl - 1,5 - benzothiazepin-4-one 1,1-dioxide hydrochloride To a solution of 15.6 grams of 2,3-dihydro-5-[2-(N-methyl - 1 - adamantylamino)ethyl] - 2 - phenyl - 1,5- benzothiazepin-4-one in 200 ml. of acetic acid there is added slowly, with vigorous stirring, a solution of 12.7 grams of potassium permanganate in 200 ml. of water. The temperature is kept between 25° and 30° by external cooling, during the addition. An aqueous solution of sodium bisulfite is then added to dissolve the precipitated maganese dioxide. After the addition of 400 ml. of water, the reaction mixture is made alkaline by the addition of potassium carbonate. The mixture is extracted several times with chloroform and the combined chloroform extracts dried over anhydrous magnesium sulfate. Concentration of the solvent under reduced pressure yields the crude base.

The base is dissolved in absolute ethanol and treated with one equivalent of ethanolic hydrogen chloride. Anhydrous ether is added and the precipitated solid filtered to yield the desired 2,3 - dihydro - 5 - [2 - (N - methyl - 1 - adamantylamino)ethyl] - 2 - phenyl - 1,5 - benzothiazepin-4-one-1,1-dioxide hydrochloride.

EXAMPLE 5

Preparation of 2,3 - dihydro - 5 - [2 - (N - methyl - 1 - adamantylamino)ethyl] - 2 - phenyl - 1,5 - benzoxazepin-4-(5H)-one hydrochloride (A) PREPARATION OF 3-PHENYL-2'-HYDROXY-ACRYLOPHENONE To a solution of 20 grams of 2'-hydroxyacetophenone and 20 grams of freshly distilled benzaldehyde in 250 ml. of ethanol there are added 40 ml. of a 50% sodium hydroxide solution. After several hours, the precipitated solid is filtered and suspended in dilute hydrochloric acid. The 3-phenyl-2'-hydroxyacrylophenone is filtered and crystallized from aqueous ethanol, melting at 88–89°.

(B) PREPARATION OF 2-PHENYL-2,3-DIHYDRO-1,4-BENZOPYRONE

A mixture of 60 grams of 3-phenyl-2'-hydroxyacrylophenone, 925 grams of 95% orthophosphoric acid and 460 ml. of glacial acetic acid is stirred and heated on a steam bath for 75 minutes. The cooled solution is poured into six liters of ice water. The precipitated product is dissolved in ether and the ether extract washed thoroughly with water. The ether solution is then dried over anhydrous magnesium sulfate and then concentrated to yield the desired 2-phenyl-2,3-dihydro-1,4-benzopyrone, which melts at 75–76° after crystallization from ligroin.

(C) PREPARATION OF 2,3-DIHYDRO-2-PHENYL-1,5-BENZOXAZEPIN-4(5H)-ONE

A suspension of 10 grams of 2-phenyl-2,3-dihydro-1,4-benzopyrone and 4.0 grams of sodium azide in 33 ml. of glacial acetic acid is stirred and 6.6 ml. of concentrated sulfuric acid added. The reaction mixture is cooled in an ice water bath to prevent the temperature from rising above 45°. It is then poured into 350 ml. of cold 10% sodium carbonate solution. The mixture is extracted with ether and the ether extracts dried over anhydrous magnesium sulfate. The ether is concentrated and the residue treated with 500 ml. of boiling hexane. The crystalline solid thus formed is filtered and washed with hexane. The 2,3 - dihydro - 2 - phenyl - 1,5 - benzoxazepin-4(5H)-one melts at 123–125° after recrystallization from acetonitrile.

(D) PREPARATION OF 2,3-DIHYDRO-5-[2-(N-METHYL-1-ADAMANTYLAMINO)ETHYL] - 2 - PHENYL-1,5-BENZ-OXAZEPIN-4(5H)-ONE HYDROCHLORIDE

Following the procedure of Example 1(C) but substituting an equivalent amount of 2,3-dihydro-2-phenyl-1,5-benzoxazepin-4(5H)-one for the 2,3-dihydro-2-phenyl-1,5-benzothiazepin-4-one, there is obtained 2,3-dihydro-5-[2-(N-methyl-1-adamantylamino)ethyl]-2 - phenyl-1,5-benzoxazepin-4(5H)-one hydrochloride.

EXAMPLE 6

*Preparation of 2,3-dihydro-5-[3-(N-methyl-1-adamantylamino)propyl]-2-phenyl-1,5-benzoxazepin-4(5H) - one hydrochloride*

(A) PREPARATION OF N-(1-ADAMANTYL)-3-CHLORO-N-METHYLPROPIONAMIDE

With ice-cooling and stirring, 37.1 grams of β-chloropropionyl chloride in 100 ml. of anhydrous benzene is added dropwise to 100 grams of 1-(methylamino)adamantane 200 ml. of anhydrous benzene. The reaction mixture is then refluxed for five hours, filtered and the filtrate washed with water and dried over anhydrous magnesium sulfate. The ether is removed by distillation and the N-(1-adamantyl)-3-chloro-N-methylpropionamide thus obtained may be used without further purification. If desired, the product may be purified by fractional distillation.

(B) PREPARATION OF N-(3-CHLOROPROPYL)-N-METHYL-1-ADAMANTANAMINE

To 3.8 grams of lithium aluminum hydride in 200 ml. of anhydrous ether is added dropwise a solution of 25 grams of N-(1-adamantyl)-3-chloro-N-methylpropionamide in 400 ml. of anhydrous ether. The mixture is then refluxed for one hour, cooled in ice, treated with 2.5 ml. of water and then 2.5 ml. of 20% aqueous sodium hydroxide. The mixture is filtered and dried over anhydrous potassium carbonate. The ether is removed by distillation and the residue is fractionally distilled under reduced pressure to yield the desired N-(3-chloropropyl)-N-methyl-1-adamantanamine.

(C) PREPARATION OF 2,3-DIHYDRO-5-[3-(N-METHYL-1-ADAMANTYLAMINO)PROPYL] - 2 - PHENYL-1,5-BENZOXAZEPIN-4(5H)-ONE HYDROCHLORIDE

Following the procedure of Example 1, but substituting an equivalent amount of the N - (3 - chloropropyl)-N-methyl-1-adamantanamine for the N-(2-bromoethyl)-N-methyl-1-adamantanamine and an equivalent amount of the 2,3-dihydro-2-phenyl-1,5-benzoxazepin-4(5H)-one for the 2,3-dihydro-2-phenyl-1,5-benzothiazepin - 4(5H)-one, there is obtained 2,3-dihydro-5-[3-(N-methyl-1-adamantylamino)propyl]-2-phenyl-1,5-benzoxazepin-4(5H) - one hydrochloride.

EXAMPLE 7

*Preparation of 2,3-dihydro-5-[2-(N-ethyl - 3 - methyl - 1-adamantylamino)ethyl]-2-phenyl - 1,5 - benzothiazepin-4-one hydrochloride*

(A) PREPARATION OF 1-ETHYLAMINO-3-METHYLADAMANTANE

A mixture of 60 grams of N-ethylacetamide, 45 grams of 1-bromo-3-methyladamantane and 60 grams of silver sulfate is heated at 100° for one hour. The cooled mixture is treated with 100 ml. of water and extracted with ether. The ether extracts are combined, dried over anhydrous magnesium sulfate and concentrated under reduced pressure to yield 1-(N-ethylacetamido)-3-methyladamantane.

A mixture of 12 grams of 1-(N-ethylacetamido)-3-methyladamantane, 12 grams of sodium hydroxide and 120 ml. of diethyleneglycol is refluxed for five hours. The cooled mixture is poured into 1 liter of water and extracted with ether. The combined ether extracts are dried over anhydrous potassium carbonate and the ether then removed by distillation to yield the 1-ethylamino-3-methyladamantane.

(B) PREPARATION OF 2,3-DIHYDRO - 5 - [2-(N-ETHYL-3-METHYL - 1 - ADAMANTYLAMINO)ETHYL]-2-PHENYL-1,5-BENZOTHIAZEPIN-4-ONE HYDROCHLORIDE

Following the procedure of Example 1, but substituting an equivalent amount of 1-ethylamino-3-methyladamantane for the N-methyl-1-adamantaneamine, there is obtained 2,3-dihydro-5-[2-(N-ethyl-3-methyl-1-adamantylamino)ethyl]-2-phenyl-1,5-benzothiazepin - 4-one hydrochloride.

EXAMPLE 8

*Preparation of 2,3-dihydro-5-[2-(N-methyl-3-methoxy-1-adamantylmethylamino)ethyl]-2-phenyl - 1,5-benzothiazepin-4-one hydrochloride*

(A) PREPARATION OF N-METHYL-3-METHOXY-1-ADAMANTANECARBOXAMIDE

A mixture of 10 grams of 3-methoxy-1-adamantanecarboxylic acid and 20 ml. of thionyl chloride are heated under reflux for 30 minutes. The excess thionyl chloride is removed by distillation under reduced pressure. Ten ml. of anhydrous benzene is added and the benzene removed by distillation under reduced pressure. The cooled residue is treated with a solution of methylamine in benzene. After several hours, the precipitated solid is removed by filtration, and the filtrate concentrated under reduced pressure to yield N-methyl-3-methoxy-1-adamantanecarboxamide.

(B) PREPARATION OF N-(3-METHOXY-1-ADAMANTYLMETHYL)METHYLAMINE

A solution of 10 grams of N-methyl - 3 - methoxy-1-adamantanecarboxamide in anhydrous ether is added slowly to a suspension of lithium aluminum hydride in anhydrous ether. After the addition is completed, the reaction mixture is heated to gentle reflux for four hours and is then cooled. Water is added dropwise to decompose the unreacted lithium aluminum hydride, followed by a 10% sodium hydroxide solution. The precipitated solids are removed by filtration and washed with ether. The combined ether solutions are dried over anhydrous magnesium sulfate and concentrated under reduced pressure to yield the N-(3-methoxy-1-adamantylmethyl)methylamine.

(C) PREPARATION OF 2,3-DIHYDRO-5-[2-(N-METHYL-3-METHOXY - 1 - ADAMANTYLMETHYLAMINO)ETHYL-2-PHENYL - 1,5 - BENZOTHIAZEPIN-4-ONE HYDROCHLORIDE

Following the procedure of Example 1, but substituting an equivalent amount of N-(3-methoxy-1-adamantylmethyl)methylamine for the N-methyl-1-adamantaneamine, there is obtained 2,3-dihydro-5 - [2 - (N-methyl)-3-methoxy-1-adamantylmethylamino)ethyl]-2-phenyl - 1,5-benzothiazepin-4-one hydrochloride.

Following the procedure of Example 1, but substituting the indicated 2-X-substituted phenyl - 2,3 - dihydro - 1,5-benzothiazepin-4-one for the 2-phenyl-2,3 - dihydro - 1,5-benzothiazepin-4-one in part (C), there is formed the designated 2-(X-substituted phenyl)-2,3-dihydro-5-[2-(N-methyl-1-adamantylamino)ethyl]-1,5 - benzothiazepin - 4-one hydrochloride.

| Example | Reactant: X is— | Product: X is— |
| --- | --- | --- |
| 9 | 4-Cl | 4-Cl |
| 10 | 4-CH$_3$ | 4-CH$_3$ |
| 11 | 2-CH$_3$O | 2-CH$_3$O |
| 12 | 4-CH$_3$O | 4-CH$_3$O |
| 13 | 3,4-(CH$_3$O)$_2$ | 3,4-(CH$_3$O)$_2$ |
| 14 | 4-CF$_3$ | 4-CF$_3$ |

Following the procedure of Example 2, but substituting the indicated acid anhydride for the acetic anhydride in part (C), the designated 5-Y-1-[2-(N-methyl-1-adamantylamino)ethyl]-1,3,4,5-tetrahydro - 4 - phenyl - 2H - 1,5-benzodiazepin-2-one hydrochloride is formed.

| Example | Reactant | Product: Y is— |
| --- | --- | --- |
| 15 | Propionic anhydride | Propionoyl. |
| 16 | Butyric anhydride | Butyroyl. |
| 17 | Isobutyric anhydride | Isobutyroyl. |
| 18 | Hexanoic anhydride | Hexanoyl. |

Following the procedure of Example 5, but substituting the indicated substituted 2'-hydroxyacetophenone for 2'-hydroxyacetophenone in part (A), there is obtained the designated R⁴-2,3-dihydro-5-[2-(N-methyl-1-adamantylamino)ethyl] - 2-phenyl-1,5-benzoxazepin-4-(5H)-one hydrochloride.

| Example | Reactant | Product: R⁴ is— |
|---|---|---|
| 19 | 4'-methyl-2'-hydroxyacetophenone | 8-methyl. |
| 20 | 5'-bromo-2'-hydroxyacetophenone | 7-bromo. |
| 21 | 5'-methoxy-2'-hydroxyacetophenone | 7-methoxy. |
| 22 | 4'-chloro-2'-hydroxyacetophenone | 8-chloro. |

What is claimed is:
1. A compound selected from the group consisting of bases of the formula

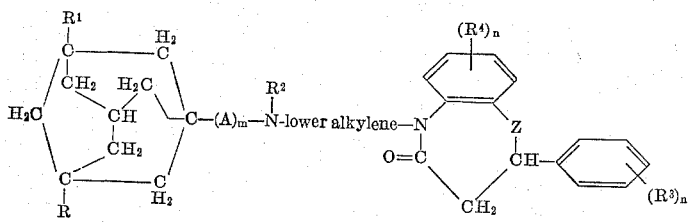

wherein R and R¹ each is a member of the group consisting of hydrogen, halo, lower alkyl and lower alkoxy, R² is a member of the group consisting of hydrogen and lower alkyl, R³ and R⁴ each is a member of the group consisting of hydrogen, lower alkyl, lower alkoxy, nitro, amino, halo and halo-lower alkyl, Z is a member of the group consisting of oxa, thia, sulfinyl, sulfonyl and lower alkanoylamino, A is lower alkylene, $m$ is a number from 0 to 1 and $n$ is a number from 1 to 3,
and acid-addition salts of said bases.

2. 2,3 - dihydro-5-(adamantylamino-lower alkyl)-2-phenyl-1,5-benzothiazepin-4-one.

3. 2,3 - dihydro-5-(N-lower alkyladamantylamino)lower alkyl-2-phenyl-1,5-benzothiazepin-4-one.

4. 2,3 - dihydro - 5-[2-(N-methyl-1-adamantylamino)ethyl]-2-phenyl-1,5-benzothiazepin-4-one.

5. 5 - lower alkanoyl-(N-lower alkyladamantylamino) lower alkyl - 1,3,4,5-tetrahydro-4-phenyl-2H-1,5-benzodiazepin-2-one.

6. 5 - acetyl-1-[2-(N-methyl-1-adamantylamino)ethyl]-1,3,4,5 - tetrahydro-4-phenyl-2H-1,5-benzodiazepin-2-one.

7. 2,3 - dihydro-5-(N-lower alkyladamantylamino)lower alkyl-2-phenyl-1,5-benzothiazepin-4-one 1-oxide.

8. 2,3 - dihydro - 5-[2-(N-methyl-1-adamantylamino)ethyl]-2-phenyl-1,5-benzothiazepin-4-one 1-oxide.

9. 2,3 - dihydro-5-(N-lower alkyladamantylamino)lower alkyl-2-phenyl-1,5-benzothiazepin-4-one 1,1-dioxide.

10. 2,3 - dihydro-5-[2-(N-methyl-1-adamantylamino)ethyl]-2-phenyl-1,5-benzothiazepin-4-one 1,1-dioxide.

11. 2,3 - dihydro-5-(N-lower alkyladamantylamino) lower alkyl-2-phenyl-1,5-benzoxazepin-4(5H)-one.

12. 2,3 - dihydro-5-[2-(N-methyl-1-adamantylamino)ethyl]-2-phenyl-1,5-benzoxazepin-4(5H)-one.

References Cited
UNITED STATES PATENTS
3,155,649  11/1964  Krapcho et al. _____ 260—239.3
3,309,361  3/1967  Krapcho et al. _____ 260—239.3

WALTER A. MODANCE, *Primary Examiner.*
R. T. BOND, *Assistant Examiner.*